United States Patent
Wan et al.

(10) Patent No.: US 9,705,948 B2
(45) Date of Patent: Jul. 11, 2017

(54) SYSTEMS AND METHODS FOR TRANSMITTING CONTENT USING SEGMENT-BASED AND NON-SEGMENT-BASED STREAMS

(71) Applicant: BROADCOM CORPORATION, Irvine, CA (US)

(72) Inventors: Wade Keith Wan, Orange, CA (US); Rajesh Shankarrao Mamidwar, San Diego, CA (US); Brian Allen Heng, Irvine, CA (US); Alexander Garland MacInnis, Los Altos, CA (US); Hongtao Zhu, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 689 days.

(21) Appl. No.: 14/029,745

(22) Filed: Sep. 17, 2013

(65) Prior Publication Data
US 2014/0359155 A1    Dec. 4, 2014

Related U.S. Application Data

(60) Provisional application No. 61/830,012, filed on May 31, 2013.

(51) Int. Cl.
| | | |
|---|---|---|
| *G06F 15/16* | (2006.01) | |
| *H04L 29/06* | (2006.01) | |
| *H04N 21/222* | (2011.01) | |
| *H04N 21/2343* | (2011.01) | |
| *H04N 21/43* | (2011.01) | |
| *H04N 21/436* | (2011.01) | |
| *H04N 21/44* | (2011.01) | |
| *H04N 21/845* | (2011.01) | |

(52) U.S. Cl.
CPC ........ *H04L 65/4076* (2013.01); *H04L 65/605* (2013.01); *H04L 65/607* (2013.01);
(Continued)

(58) Field of Classification Search
CPC ... H04L 47/2425; H04L 65/60; H04L 65/607; H04L 65/4084; H04L 65/4076; H04L 65/608; H04L 67/2823
(Continued)

(56) References Cited

U.S. PATENT DOCUMENTS

| | | | | |
|---|---|---|---|---|
| 9,319,289 B2 * | 4/2016 | MacInnis | ................ | H04L 65/00 |
| 9,402,107 B2 * | 7/2016 | Gonder | ................ | H04L 65/605 |

(Continued)

OTHER PUBLICATIONS

Cannes, "The Lowdown on Apple's HTTP Adaptive Bitrate Streaming", retrieved from <http://newteevee.com/2009/06/10/the-lowdown-on-apples-http-adaptive-bitrate-streaming>, Jun. 10, 2009, 8 pgs.

(Continued)

*Primary Examiner* — Kristie Shingles
(74) *Attorney, Agent, or Firm* — McDermott Will & Emery LLP

(57) ABSTRACT

Systems and methods for transmitting content using segment-based and non-segment-based streams are provided. In some aspects, a method includes identifying at least one segment-based stream of content. Each segment-based stream is associated with a respective first bit rate and includes one or more segments of the content. The method also includes identifying at least one non-segment-based stream of the content. Each non-segment-based stream is associated with a second bit rate and includes a continuous stream of the content. The method also includes enabling switching between use of i) the at least one segment-based stream and ii) the at least one non-segment-based stream to continuously transmit the content to one or more client devices.

20 Claims, 7 Drawing Sheets

(52) U.S. Cl.
CPC ..... *H04N 21/222* (2013.01); *H04N 21/23439* (2013.01); *H04N 21/234336* (2013.01); *H04N 21/4302* (2013.01); *H04N 21/43615* (2013.01); *H04N 21/44016* (2013.01); *H04N 21/8456* (2013.01)

(58) Field of Classification Search
USPC ........................................................ 709/231
See application file for complete search history.

(56) References Cited

U.S. PATENT DOCUMENTS

| | | | | |
|---|---|---|---|---|
| 2009/0010437 | A1* | 1/2009 | Takashima | G11B 20/00086 380/277 |
| 2014/0020037 | A1* | 1/2014 | Hybertson | H04N 21/2365 725/109 |
| 2014/0143823 | A1* | 5/2014 | Manchester | H04L 65/4084 725/116 |
| 2014/0281000 | A1* | 9/2014 | Dattagupta | H04L 47/11 709/231 |
| 2014/0282777 | A1* | 9/2014 | Gonder | H04L 65/605 725/109 |
| 2014/0344443 | A1* | 11/2014 | MacInnis | H04L 43/08 709/224 |

OTHER PUBLICATIONS

Lawler, "Move Gets Streaming Patent; Are Adobe & Apple Hosed?", retrieved from <http://gigaom.com/video/move-gets-streaming-patent-are-adobe-apple-hosed-2>, Sep. 15, 2010, 8 pgs.

* cited by examiner

SYSTEMS AND METHODS FOR TRANSMITTING CONTENT USING SEGMENT-BASED AND NON-SEGMENT-BASED STREAMS

CROSS-REFERENCES TO RELATED APPLICATIONS

The present application claims the benefit of U.S. Provisional Patent Application Ser. No. 61/830,012, titled "Systems and Methods for Transmitting Content Using Segment-Based and Non-Segment-Based Streams," filed on May 31, 2013, which is hereby incorporated by reference in its entirety for all purposes.

FIELD

The subject technology generally relates to transmitting content and, in particular, relates to systems and methods for transmitting content using segment-based and non-segment based streams.

BACKGROUND

Adaptive bit rate streaming is a technique used in streaming multimedia over networks. It involves detecting a user device's effective network bandwidth and processing capacity in real time, and adjusting the quality of a multimedia stream accordingly. A server, for example, may store a single multimedia stream at various bit rates. The user device may select between streaming the different encodings depending on available resources. As a result, adaptive bit rate streaming can be supported by servers with relatively simple functionality and can be used for both high bit rate and low bit rate connections.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Figure 1:
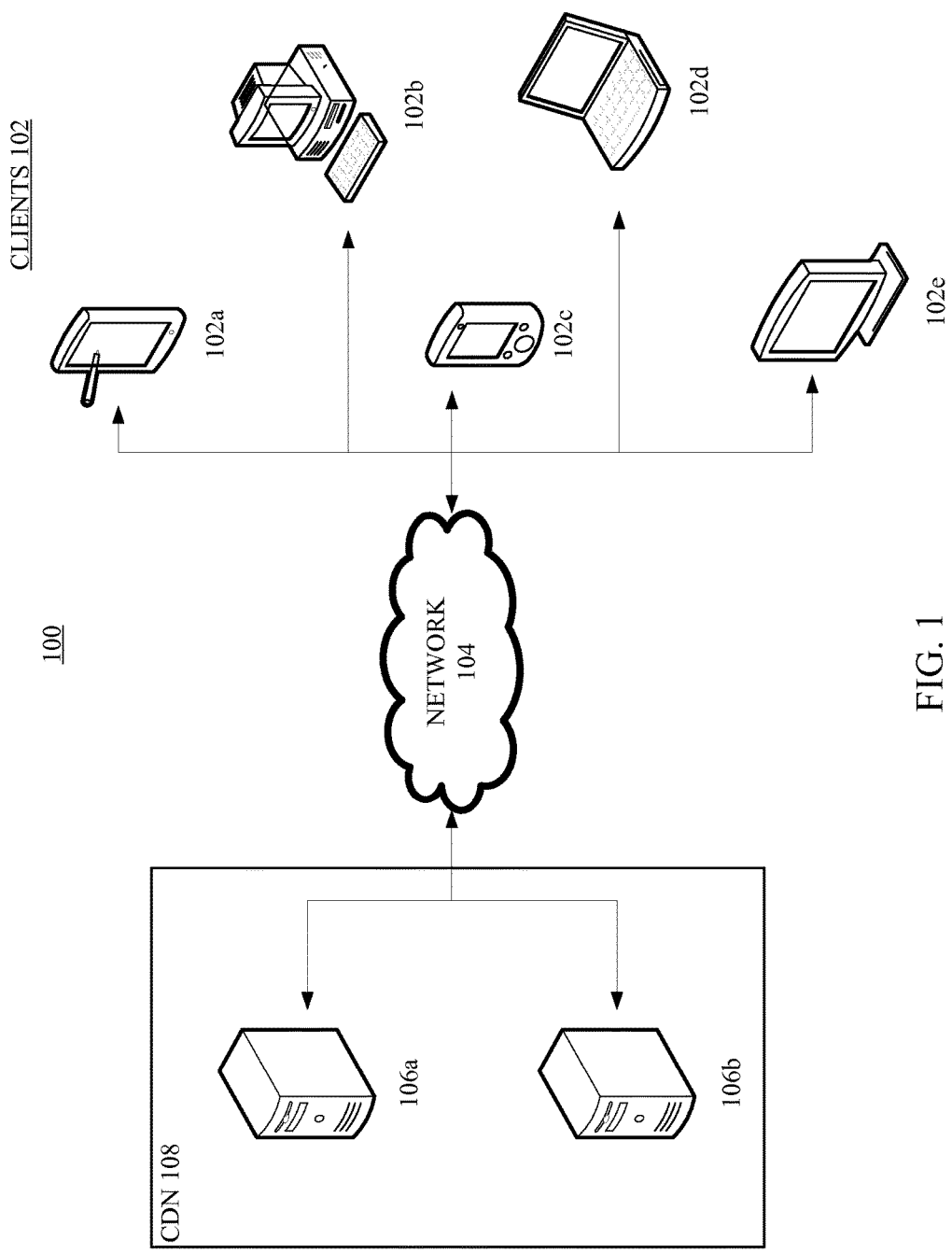
FIG. 1 illustrates an example of an environment in which adaptive bit rate streaming may be used, in accordance with various aspects of the subject technology.

FIG. 1 illustrates an example of environment 100 in which adaptive bit rate streaming may be used, in accordance with various aspects of the subject technology. Environment 100 includes content delivery network (CDN) 108 and client devices 102 (e.g., client devices 102a, 102b, 102c, 102d, and 102e). CDN 108 includes servers 106 (e.g., servers 106a and 106b). One goal of CDN 108 is to serve content to client devices 102 with high availability and high performance. In some aspects, the phrase "content delivery network," as used herein, encompasses its plain and ordinary meaning (e.g., as understood by those of ordinary skill in the art). In some aspects, the phrase "content delivery network," as used herein, refers to any entity that delivers content (e.g., a cable head-end that delivers content as an analog and/or a digital cable transmission, a satellite television provider that delivers content as a satellite transmission, any one or more devices that deliver content to another device, etc.).

As shown in FIG. 1, CDN 108 and client devices 102 are connected over network 104. Network 104 can include, for example, any one or more of a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, network 104 can include, but is not limited to, any one or more network topologies such as a bus network, a star network, a ring network, a mesh network, a star-bus network, tree or hierarchical network, and the like.

Client devices 102 and servers 106 can be any electronic device having processing hardware, memory, and communications capability necessary to perform some or all of the operations disclosed herein. Client devices 102, for example, can be desktop computers (e.g., client device 102b), mobile computers (e.g., client device 102d), tablet computers (e.g., client device 102a), mobile devices (e.g., smartphones or personal digital assistants such as client device 102c), set top boxes (e.g., including televisions with one or more processors coupled thereto and/or embedded therein, such as client device 102e), video game consoles, or any other electronic devices having memory, processing hardware, and communications capabilities for receiving content from servers 106. Servers 106 may be adaptive bit rate (ABR) servers that provide content over network 104 to client devices 102.

Figure 2:
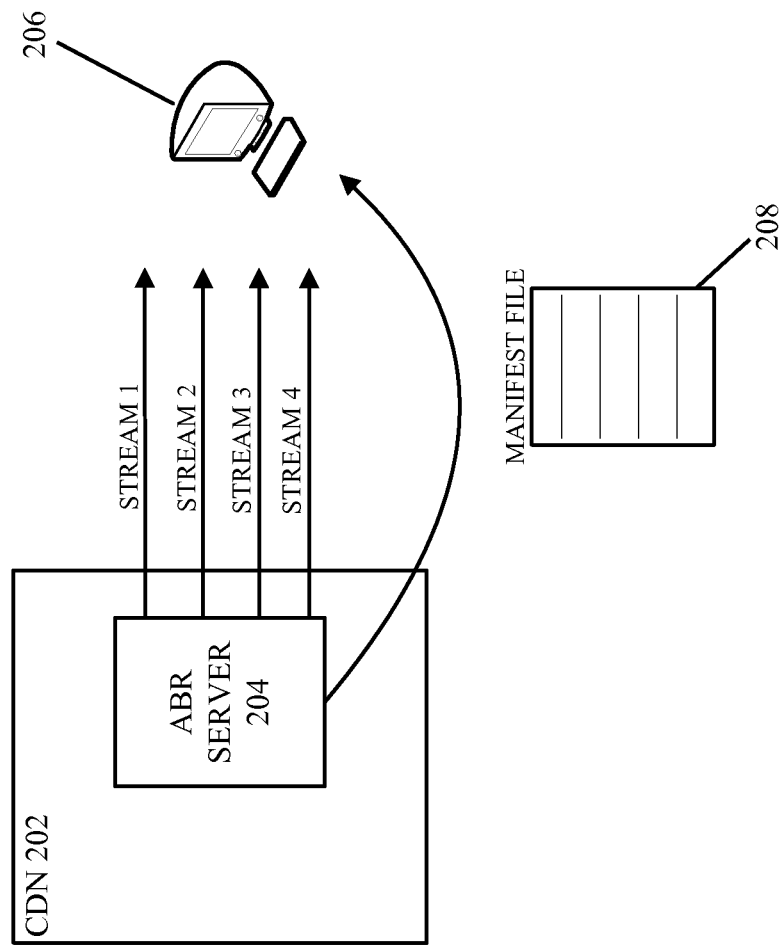
FIG. 2 illustrates an example of an adaptive bit rate server providing content to a particular client device, in accordance with various aspects of the subject technology.

FIG. 2 illustrates an example of ABR server 204 providing content to a particular client device 206, in accordance with various aspects of the subject technology. As shown in FIG. 2, ABR server 204 is part of CDN 202. In an adaptive bit rate streaming system, ABR server 204 may deliver different versions of the same content, such as video and/or audio, to client device 206, with each version of the content being represented by a different stream (e.g., shown in FIG. 2 as stream 1, stream 2, stream 3, and stream 4). For example, stream 1, stream 2, stream 3, and stream 4 may each represent different versions of the content that can be delivered to client device 206. Although FIG. 2 illustrates stream 1, stream 2, stream 3, and stream 4 simultaneously, it is understood that ABR server 204 may deliver the content one stream at a time to client device 206. Each stream may comprise one or more segments of the content (e.g., each segment may have a duration of 2-10 seconds). The segments of one stream may be a different variant of the content compared to segments of another stream. For example, the segments of one stream may be encoded at a different bit rate compared to the segments of another stream. Providing different versions of the content to client device 206 allows client device 206 to receive the content in a way that is most appropriate for itself. For example, client device 206 may select a stream at a bit rate that it is capable of receiving based on its computing resources and available bandwidth.

ABR server 204 may determine the particular streams that client device 206 is likely able to receive and may advertise these streams as being available to the client device. For example, ABR server 204 may generate, and send to client device 206, manifest file 208 that lists the available streams, the different bit rates at which each of these streams has been encoded, and a network identifier for accessing each segment of a corresponding stream (e.g., a uniform resource locator (URL)). Thus, manifest file 208 provides an indication to client device 206 of which streams are available, each with an associated bit rate.

Client device 206 may retrieve each stream at the bit rate that is appropriate for itself (e.g., based on network bandwidth conditions that are determinable by client device 206). In this manner, client device 206 may adaptively retrieve streams that are encoded at different bit rates in accordance with changing network bandwidth conditions.

Figure 3:
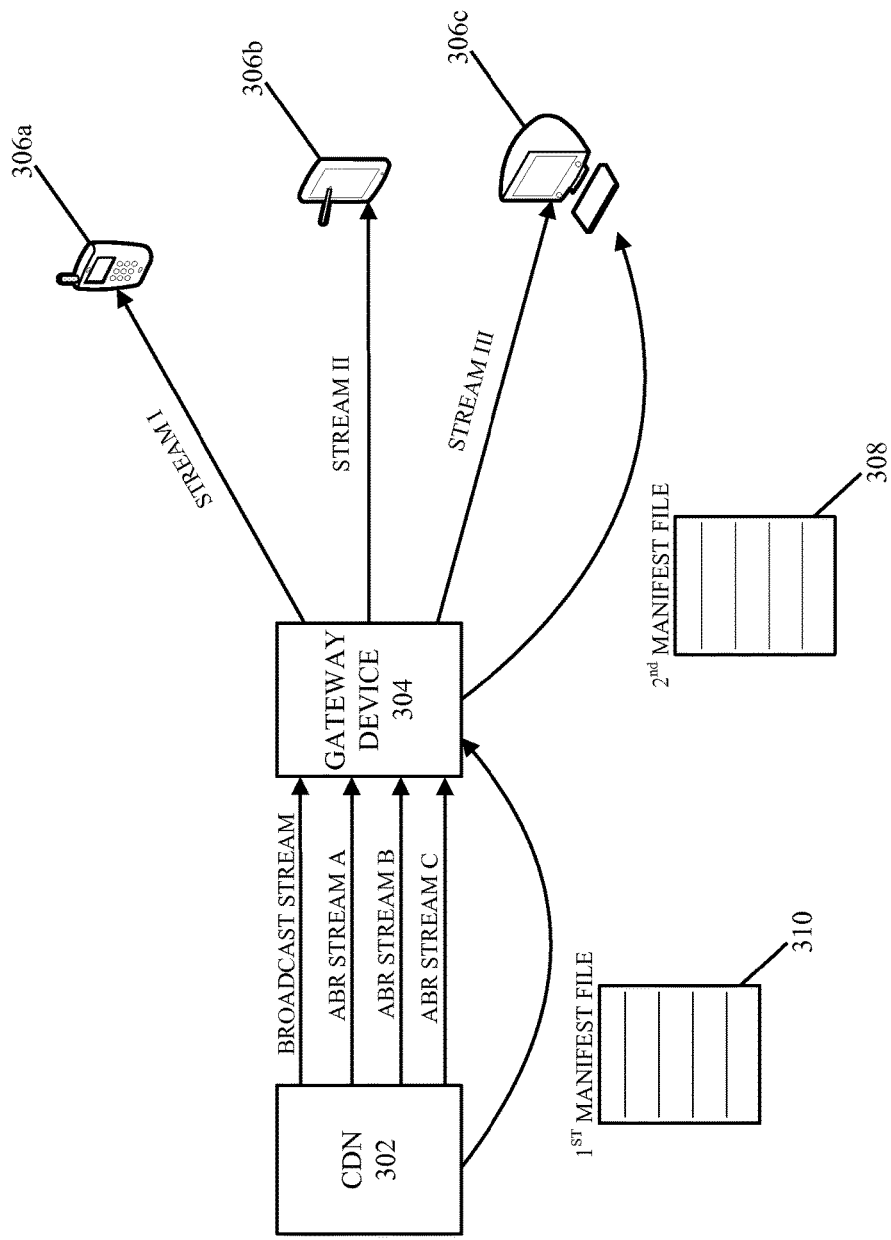
FIG. 3 illustrates an example of a gateway device placed between a content delivery network and client devices, in accordance with various aspects of the subject technology.

In some aspects, a gateway device may be placed between a CDN and one or more client devices to facilitate communications between the CDN and the one or more client devices. FIG. 3 illustrates an example of gateway device 304 placed between CDN 302 and client devices 306 (e.g., client devices 306a, 306b, and 306c), in accordance with various aspects of the subject technology. Gateway device 304, for example, may be a set top box in a home that receives content from CDN 302 and distributes the content to different client devices 306 within the home. However, gateway device 304 may be a device that receives content and distributes it to different client devices in any suitable network.

In some aspects, CDN 302 may provide a single stream of the content to gateway device 304. For example, such a stream may be a high quality stream of content (e.g., highest resolution available, highest bit rate available, etc.). The single stream may be a non-segment-based stream of content that provides a continuous stream of the content, such as a broadcast stream. According to one or more implementations, a modulation scheme of the broadcast stream may be quadrature amplitude modulation (QAM). However, it is understood that the broadcast stream of content may include any other suitable modulation scheme.

CDN 302 may also provide a plurality of streams of the content for gateway device 304 to receive (e.g., one at a time). In some aspects, at least one of these streams may be a broadcast stream, as shown in FIG. 3. In some aspects, some or all of the plurality of streams may be segment-based streams of the content, such as the ABR streams as discussed with respect to FIG. 2. In such a situation, CDN 302 may utilize adaptive bit rate streaming to provide the content to gateway device 304, which may serve as a client device relative to CDN 302. FIG. 3 illustrates an example of CDN 302 providing both a non-segment based stream (e.g., the broadcast stream) and a plurality of segment-based streams (e.g., ABR stream A, ABR stream B, and ABR stream C) for gateway device 304 to receive. CDN 302 may provide gateway device 304 with manifest file 310 that lists the available ABR streams (e.g., each ABR stream representing a different version of the content). Gateway device 304 may request from CDN 302 an available stream listed in manifest file 310 or the broadcast stream. Gateway device 304 may then receive the requested stream from CDN 302. The streams that gateway device 304 receives from CDN 302 may be referred to as input streams. Although gateway device 304 is shown as requesting streams from a single CDN 302 in FIG. 3, it is understood that gateway device 304 can request any number of streams from any number of content delivery networks. For example, gateway device 304 may request stream A from a first CDN, stream B from a second CDN, stream C from a third CDN, stream D from a fourth CDN, and the broadcast stream from a fifth CDN.

Upon receiving the content from CDN 302, gateway device 304 may provide the content to one or more client devices 306 (e.g., in the same or similar manner as CDN 302 providing the content to gateway device 304). For example, gateway device 304 may provide one or more streams of the content for each client device 306 to receive (e.g., one at a time). These streams may include at least one non-segment-based stream of content (e.g., the broadcast stream) and/or at least one segment-based stream of content (e.g., ABR stream A, ABR stream B, and/or ABR stream C).

When gateway device 304 provides a plurality of streams that include multiple segment-based streams for each client device 306 to receive, gateway device 304 may serve as an adaptive bit rate server (e.g., relative to client devices 306) and utilize adaptive bit rate streaming to provide the content to each client device 306. For example, as shown in FIG. 3, gateway device 304 may (i) provide client device 306c manifest file 308 that lists available streams (e.g., ABR stream A, ABR stream B, ABR stream C, an ABR stream similar in quality to the broadcast stream, etc.), (ii) receive a request from client device 306c for one of the available streams listed in manifest file 308, and (iii) transmit the requested stream to client device 306c. The streams that gateway device 304 transmits to client devices 306 may be referred to as output streams (e.g., illustrated in FIG. 3 as stream I, stream II, and stream III).

Client devices 306 may sometimes request streams at bit rates that are not provided by CDN 302. In this regard, gateway device 304 may receive the input streams from CDN 302 at a particular set of bit rates, transcode at least one of these input streams to different bit rates that are requested by client devices 306, and transmit the transcoded input streams (e.g., as output streams) to client devices 306. Thus, an output stream that gateway device 304 transmits to each client device 306 may either be a transcoded input stream or a non-transcoded input stream (e.g., one that bypasses gateway device 304 without having to be transcoded).

In one or more implementations, depending on network conditions and available resources, a client device 306 may switch between receiving different streams (e.g., transcoded broadcast stream that becomes an ABR stream, non-transcoded broadcast stream, transcoded ABR stream A, non-transcoded ABR stream A, etc.). However, since gateway device 304 provides at least one segment-based stream and at least one non-segment-based stream (e.g., non-transcoded broadcast stream) for each client device 306 to receive, switching between these streams may cause discontinuities in the content being delivered to client devices 306.

According to various aspects of the subject technology, systems and methods are provided for delivering content to client devices using both segment-based and non-segment-based streams (e.g., allowing client devices to switch between receiving a segment-based stream and a non-segment-based stream). Various techniques are provided to enable switching between the use of at least one segment-based stream (or otherwise ABR stream) and at least one non-segment-based stream (or otherwise non-ABR stream) to continuously transmit the content to the client devices. For example, markers may be added to a non-segment-based stream so that gateway device 304 can synchronize the non-segment based stream with a segment-based stream (e.g., such that gateway device 304 can identify where segment breaks are and switch between the two types of content at synchronized locations). The markers may be aligned with the segment boundaries of the segment-based streams, and as a result, provide an indication of when the switching may occur.

Figure 4:
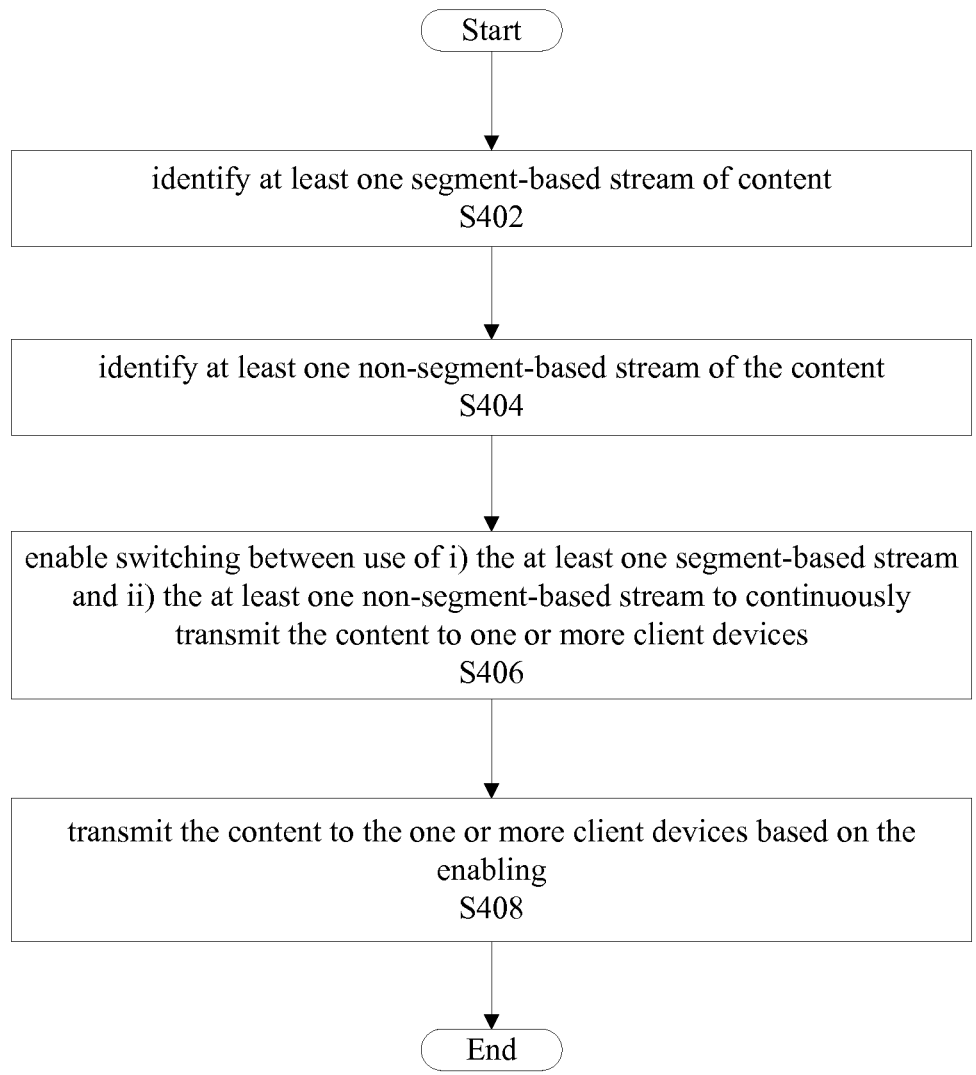
FIG. 4 illustrates an example of a method for transmitting content using segment-based and non-segment-based streams, in accordance with various aspects of the subject technology.

FIG. 4 illustrates an example of method 400 for transmitting content using segment-based and non-segment-based streams, in accordance with various aspects of the subject technology. Method 400 is described herein with reference to FIGS. 3, 5A, and 5B. However, method 400 is not limited to the examples presented in FIGS. 3, 5A, and 5B. Furthermore, although method 400 is illustrated in the order shown in FIG. 4, it is understood that method 400 may be implemented in a different order.

According to S402, gateway device 304 identifies at least one segment-based stream of content to deliver to client devices 306. For example, the at least one segment-based stream may include ABR stream A, ABR stream B, and ABR stream C provided by CDN 302. Each of these streams may comprise one or more segments of the content encoded at a respective bit rate.

According to S404, gateway device 304 identifies at least one non-segment-based stream of the content to deliver to client devices 306. For example, the at least one non-segment-based stream may include the broadcast stream provided by CDN 302. As discussed above, the broadcast stream may comprise a continuous stream of the content. The broadcast stream may also be encoded at a particular bit rate. In one or more implementations, the bit rate of the broadcast stream can be greater than any of the bit rates of ABR stream A, ABR stream B, or ABR stream C. For example, the broadcast stream may be encoded at 20 megabits per second (mbps), ABR stream A may be encoded at 15 mbps, ABR stream B may be encoded at 10 mbps, and ABR stream C may be encoded at 5 mbps. However, it is understood that the bit rate of the broadcast stream can be any value, such as at bit rates that are lower than any of the bit rates of ABR stream A, ABR stream B, or ABR stream C.

According to S406, gateway device 304 enables switching between use of i) at least one segment-based stream (e.g., ABR stream A, ABR stream B, or ABR stream C) and ii) at least one non-segment-based stream (e.g., broadcast stream) to continuously transmit the content to client devices 306. Gateway device 304 may enable the switching according to various techniques that may be used alone or in combination with one another.

According to one technique for enabling the switching between segment-based and non-segment based streams, gateway device 304 may generate a manifest file that indicates all the available streams that may be provided to client devices 306, including segment-based streams (transcoded and/or non-transcoded) and non-segment-based streams (transcoded and/or non-transcoded). In some aspects, the non-segment-based streams may be packaged, arranged, or otherwise modified such that one or more portions thereof align with one or more segments of the segment-based stream. By listing all the available streams in the manifest file and providing the manifest file to client devices 306, client devices 306 may be able to request the appropriate streams to receive, even if the streams include segment-based streams and non-segment based streams.

In one or more implementations, gateway device 304 may receive manifest file 310 from CDN 302 and determine from this file what segment-based streams (e.g., ABR stream A, ABR stream B, and ABR stream C) are available to provide to client devices 306. If gateway device 304 receives at least one non-segment-based stream (e.g., the broadcast stream), gateway device 304 may also determine that this stream is available to provide to client devices 306. In some aspects, gateway device 304 may determine whether there are additional streams that may be provided to client devices 306 (e.g., by transcoding, packaging, arranging, or otherwise modifying available segment-based or non-segment-based streams to generate new streams). For example, gateway device 304 may determine what output bit rates to transcode the broadcast stream, ABR stream A, ABR stream B, and/or ABR stream C in order to generate the new streams. In some aspects, the determined output bit rates may be the bit rates that are requested by client devices 306. In some aspects, gateway device 304 may determine the output bit rates to be the bit rates that each client device 306 is capable of receiving (e.g., based on network bandwidth conditions, computing resources of each client device 306, history of requests from each client device 306, etc.). In this regard, gateway device 304 may generate and/or select a stream encoded at an appropriate bit rate to provide to each client device 306.

Gateway device 304 may generate manifest file 308 listing any available streams that can be provided to each client device 306. Gateway device 304 may then provide manifest file 308 to client devices 306, thereby allowing client devices 306 to request any segment-based streams (transcoded and/or non-transcoded) or non-segment-based streams (transcoded and/or non-transcoded).

According to another technique for enabling the switching between segment-based and non-segment based streams, markers may be added to the non-segment-based stream (e.g., adding markers to the broadcast stream by CDN 302). As discussed above, markers, for example, may be added to a non-segment-based stream so that gateway device 304 can synchronize the non-segment based stream with a segment-based stream (e.g., such that gateway device 304 can identify where segment breaks are and switch between the two types of content at synchronized locations). The markers may be aligned with the segment boundaries of the segment-based streams, and as a result, provide an indication to gateway device 304 of when it may switch between the non-segment based stream and the segment-based streams. For example, markers can be inserted in original MPEG2 Transport streams at CDN 302 in such a way that the markers can be transparent to QAM receivers for legacy compatibility (e.g., on separate independent MPEG2 packet identifier (PID) or in adaptation fields as private data.).

Figure 5A:
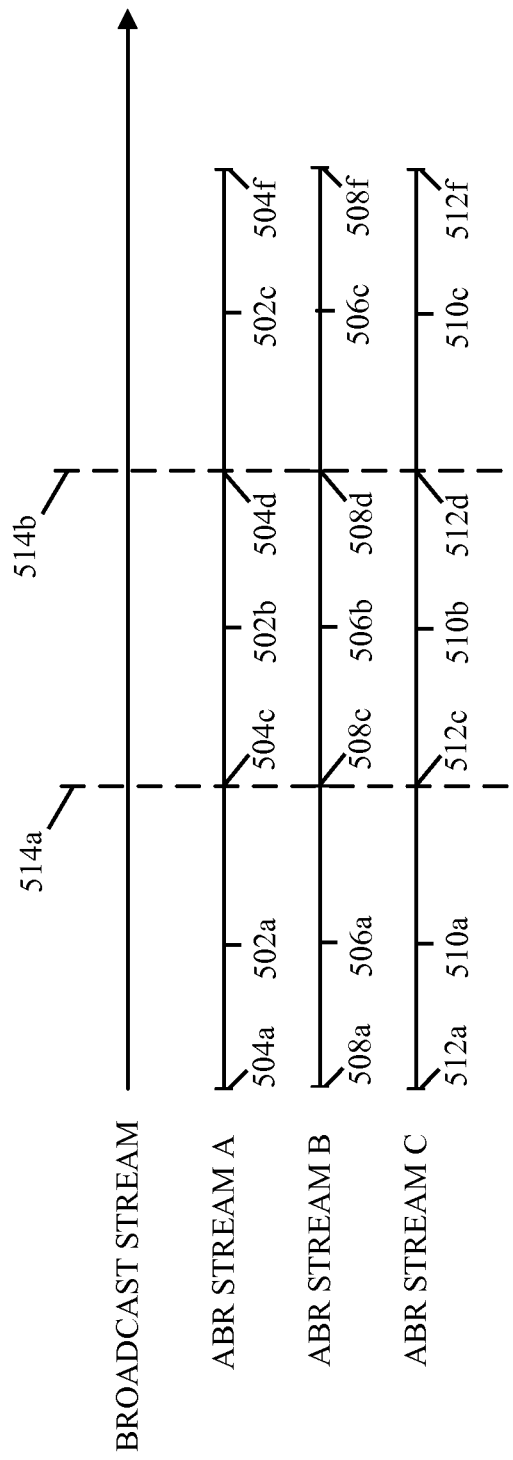
FIG. 5A illustrates an example of adding markers to a non-segment-based stream, in accordance with various aspects of the subject technology.

FIG. 5A illustrates an example of adding markers to a non-segment-based stream, in accordance with various aspects of the subject technology. FIG. 5A compares a non-segment-based stream, the broadcast stream, to segment-based streams, which include ABR stream A, ABR stream B, and ABR stream C. ABR stream A includes segments 502a, 502b, and 502c. Segment 502a includes respective boundary positions 504a and 504c, segment 502b includes respective boundary positions 504c and 504d, and segment 502c includes respective boundary positions 504d and 504f. Similarly, ABR stream B includes segments 506a, 506b, and 506c. Segment 506a includes respective boundary positions 508a and 508c, segment 506b includes respective boundary positions 508c and 508d, and segment 506c includes respective boundary positions 508d and 508f. ABR stream C includes segments 510a, 510b, and 510c. Segment 510a includes respective boundary positions 512a and 512c, segment 510b includes respective boundary positions 512c and 512d, and segment 510c includes respective boundary positions 512d and 512f.

According to various aspects of the subject technology, CDN 302 may determine the boundary positions of the segments of any of ABR stream A, ABR stream B, and ABR stream C. CDN 302 may then segment the broadcast stream based on the determined boundary positions. For example, gateway device 304 may determine that segment 502b ends at boundary position 504c and that segment 502a, which follows segment 502b, also begins at boundary position 504c. CDN 302 may add, to the broadcast stream, marker 514a that is aligned with boundary position 504c. Similarly, CDN 302 may determine that segment 502c ends at boundary position 504d and that segment 502b, which follows segment 502c, also begins at boundary position 504d. CDN 302 may add, to the broadcast stream, marker 514b that is aligned with boundary position 504d.

When CDN 302 provides the broadcast stream (with markers 514a and 514b added thereto), ABR stream A, ABR stream B, and ABR stream C to gateway device 304, gateway device 304 can determine that, if switching between the broadcast stream and any one of the ABR streams is needed, it can switch at the points where markers 514a and 514b are added. For example, if client devices 306 are receiving ABR stream A, for example, and then decide to request the broadcast stream, gateway device 304 may switch to the broadcast stream at the points where markers 514a and 514b are added. Switching in this manner may allow the content to be continuously delivered to client devices 306. Although CDN 302 is described as adding markers to the broadcast stream, it is understood that gateway device 304 may also add markers to the broadcast stream (e.g., by looking at timestamps such as program clock reference (PCR)/presentation time stamp (PTS) within each stream).

According to various aspects of the subject technology, it may be desirable to record the broadcast stream on a local memory of gateway device 304 (e.g., a local hard drive of gateway device 304 for digital video recording). Recording the broadcast stream may allow client devices 306 to use trick modes and/or random seeks seamlessly. The broadcast stream may be recorded with an indication of where switching may occur (e.g., the broadcast stream may be recorded with the markers). According to certain aspects, gateway device 304 may retrieve the recorded broadcast stream from memory, and transcode this stream to generate one or more new streams having segment boundaries that align with the markers.

Although markers are described as being added to the broadcast stream to align points in the broadcast stream with the segments boundaries of the ABR streams, it is understood that the ABR streams themselves may be generated (e.g., by CDN 302 and/or gateway device 304) such that the segment boundaries of the ABR streams align with different points in the broadcast stream. According to one or more implementations, the broadcast stream may comprise groups of pictures (GOP). In some aspects, CDN 302 may use the GOP structure of the broadcast stream as a template to generate segmented ABR streams to provide to gateway device 304 (e.g., ABR stream A, ABR stream B, ABR stream C). In some aspects, gateway device 304 may use the GOP structure of the broadcast stream as a template to generate new ABR streams to provide to client devices 306 (e.g., by transcoding the broadcast stream and/or the ABR streams received from CDN 302).

Figure 5B:
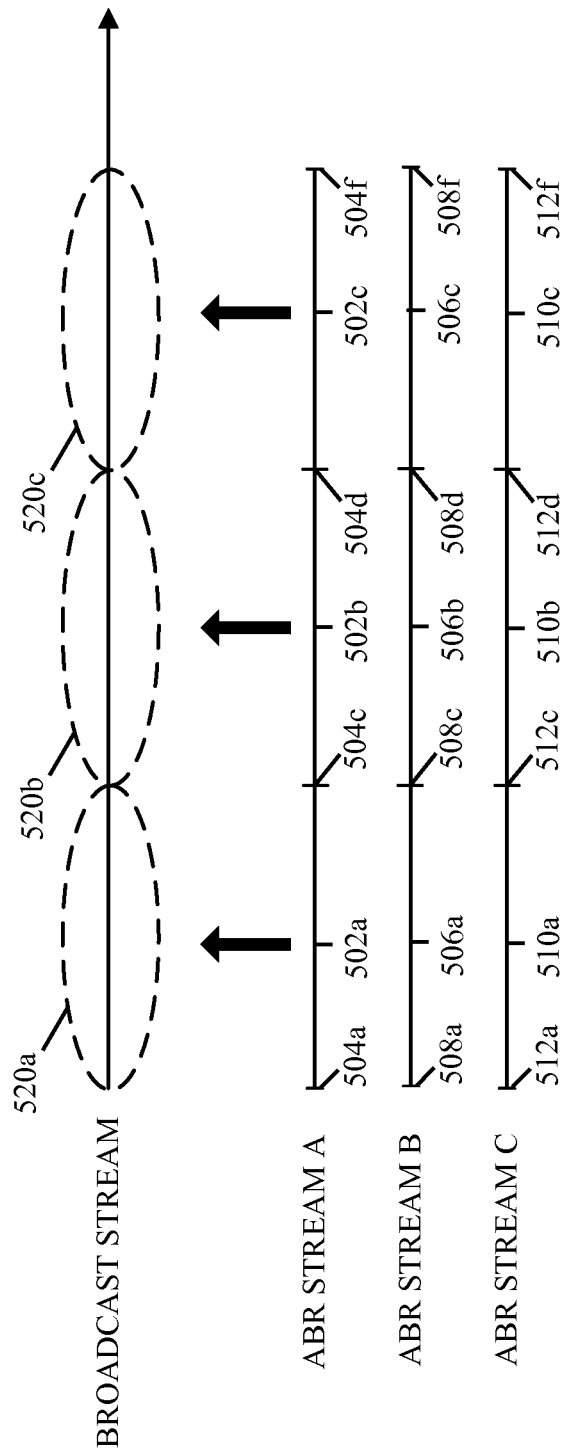
FIG. 5B illustrates an example of segment-based streams being segmented to align with different points in a non-segment-based stream, in accordance with various aspects of the subject technology.

FIG. 5B illustrates an example of ABR streams being segmented to align with different points in the broadcast stream, in accordance with various aspects of the subject technology. As shown in FIG. 5B, the broadcast stream comprises GOP 520a, GOP 520b, and GOP 520c. The ABR streams may be segmented to align with a boundary position of any one of the GOPs. For example, ABR stream A may be segmented such that boundary position 504d of segment 502b aligns with a boundary position of GOP 520b (e.g., an I-frame of GOP 520b). In some aspects, markers may be added to a boundary position of a GOP, thereby providing an indication of where the ABR streams may be segmented in order to align with the boundary position of the GOP. According to various aspects of the subject technology, the broadcast stream may be enabled to be transcoded such that the boundary position of each GOP is retained after the transcoding.

According to S408, gateway device 304 transmits the content to client devices 306 based on the enabling (e.g., as described with respect to S406). For example, assume that GOP 520c of the broadcast stream is aligned with segment 502c of ABR stream A, and that GOP 520b of the broadcast stream is aligned with segment 502b of ABR stream A. GOP 520b follows GOP 520c, while segment 502b follows segment 502c. Further assume client device 306c is initially requesting the broadcast stream, and therefore, GOP 520c is being provided to client device 306c (e.g., output stream III initially comprises the broadcast stream). However, if client device 306c decides to switch streams to ABR stream A, output stream III may then comprise segment 502b of ABR stream A. Since segment 502b is aligned with GOP 520b, which follows GOP 520c, the content delivered to client device 306c appears to a user of client device 306c as though it were continuously delivered without any interruption (despite the switching).

Although method 300 is described herein as being performed by gateway device 304, it is understood that any of the operations performed by gateway device 304 can be performed by any device participating in the transmission of the content. For example, client device 306 may perform one or more of the operations of gateway device 304 to transmit content to downstream devices (e.g., client device 306 may serve as a gateway device to the downstream devices). Furthermore, although the streams are described as being transcoded into particular bit rates, it is understood that the streams can be transcoded into other non-bit rate features (e.g., codecs, frame rates, resolutions, formats, etc.). For example, a non-bit rate feature may be any feature that helps provides an objective and/or subjective indication of whether a particular stream is better in quality (or is otherwise more desirable) than another stream.

Figure 6:
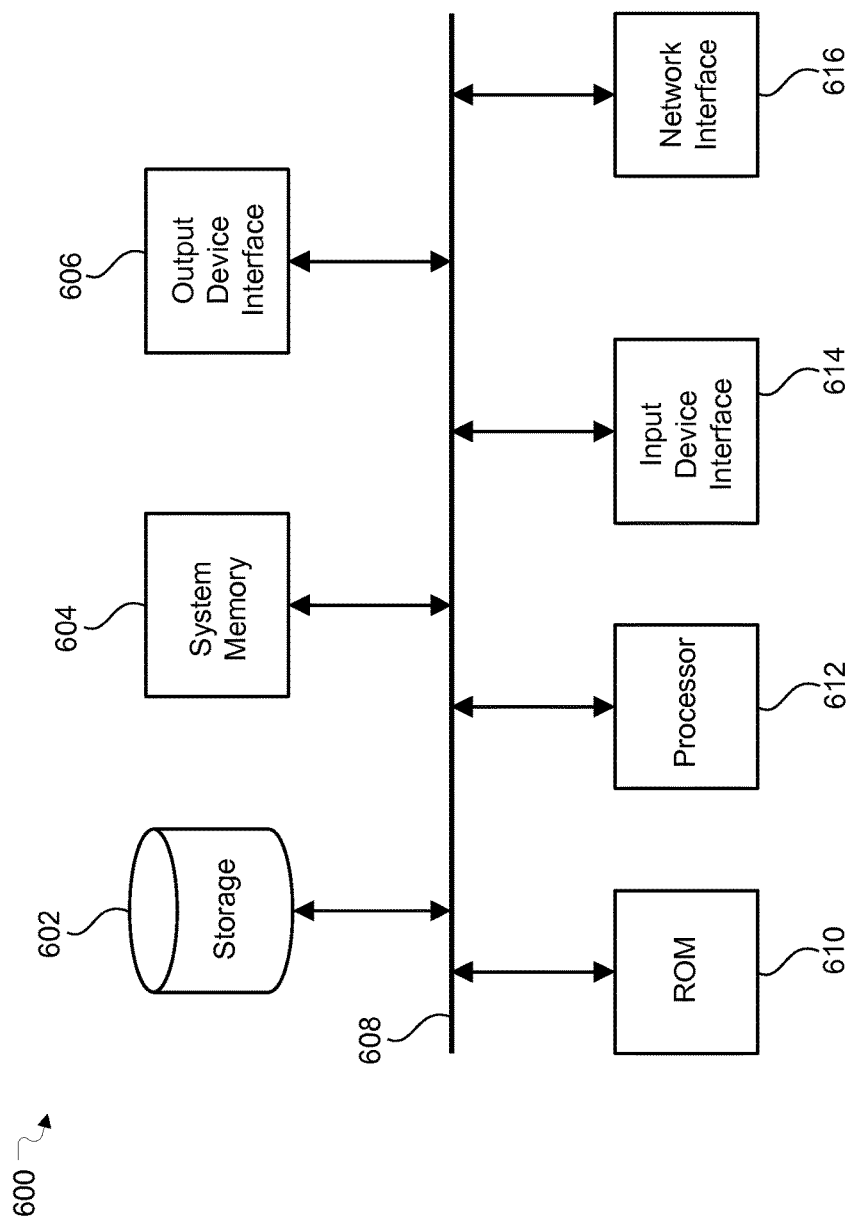
FIG. 6 conceptually illustrates an electronic system with which aspects of the subject technology may be implemented.

FIG. 6 conceptually illustrates electronic system 600 with which aspects of the subject technology may be implemented. Electronic system 600, for example, can be a desktop computer, a laptop computer, a tablet computer, a server, a switch, a router, a base station, a receiver, a phone, a personal digital assistant (PDA), a gateway device, any device for transmitting content using segment-based and non-segment-based streams, or generally any electronic device that transmits signals/content over a network. Such an electronic system includes various types of computer readable media and interfaces for various other types of computer readable media. Electronic system 600 includes bus 608, processing unit(s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects processing unit(s) 612 with ROM 610, system memory 604, and permanent storage device 602. From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory. System memory 604 stores any of the instructions and data that processing unit(s) 612 needs at runtime. In one or more implementations, the processes of the subject disclosure are stored in system memory 604, permanent storage device 602, and/or ROM 610. From these various memory units, processing unit(s) 612 retrieves instructions to execute and data to process in order to execute the processes of one or more implementations.

Bus 608 also connects to input and output device interfaces 614 and 606. Input device interface 614 enables a user to communicate information and select commands to the electronic system. Input devices used with input device interface 614 include, for example, alphanumeric keyboards and pointing devices (also called "cursor control devices"). Output device interface 606 enables, for example, the display of images generated by electronic system 600. Output devices used with output device interface 606 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, bus 608 also couples electronic system 600 to a network (not shown) through network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While one or more implementations described herein may be software processes executed by microprocessors or multi-core processors, the one or more implementations may also be performed by one or more integrated circuits, such as application specific integrated circuits (ASICs) or field programmable gate arrays (FPGAs). Such integrated circuits, for example, may execute instructions that are stored on the circuit itself.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to analyze and control an operation or a component may also mean the processor being programmed to analyze and control the operation or the processor being operable to analyze and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for transmitting content using segment-based and non-segment-based streams, the method comprising:
   identifying at least one segment-based stream of content, wherein each of the at least one segment-based stream is associated with a respective first bit rate and comprises one or more segments of the content;
   identifying at least one non-segment-based continuous stream of the content, wherein each of the at least one non-segment-based continuous stream is associated with a second bit rate and comprises a continuous stream of the content; and
   enabling switching between use of i) the at least one segment-based stream and ii) the at least one non-segment-based continuous stream responsive to requests from one or more client devices therefor to continuously transmit the content to the one or more client devices without segmenting the at least one non-segment-based continuous stream.

2. The method of claim 1, wherein each of the at least one segment-based stream of the content comprises an adaptive bit rate (ABR) stream of the content, and wherein each of the at least one non-segment-based stream of the content comprises a broadcast stream of the content.

3. The method of claim 1, wherein enabling the switching comprises:
   receiving a first indicator of the at least one segment-based stream; and
   generating one or more output streams of the content to provide to the one or more client devices based on the first indicator and the identified at least one non-segment-based stream.

4. The method of claim 3, wherein each output stream comprises at least one of a transcoded segment-based stream, a non-transcoded segment-based stream, a transcoded non-segment-based stream, and a non-transcoded non-segment based stream.

5. The method of claim 4, wherein at least one of the transcoded non-segment based stream and the non-transcoded non-segment based stream is packaged, arranged, or modified such that a portion thereof is aligned with a segment of at least one of the transcoded segment-based stream and the non-transcoded segment-based stream.

6. The method of claim 1, further comprising:
   providing, to the one or more client devices, a manifest file that lists the at least one segment-based stream in association with the respective first bit rate and lists another segment-based stream that is representative of the at least one non-segment-based stream in association with the second bit rate; and wherein the requests from the one or more client devices comprise requests from the one or more client devices for the content at the respective first bit rate and the second bit rate, the requests being received responsive to providing the manifest file to the one or more client devices.

7. The method of claim 1, further comprising determining a point in the at least one non-segment-based stream at which to switch by identifying at least one marker added to the at least one non-segment-based stream that is aligned with at least one boundary position of the one or more segments of the at least one segment-based stream.

8. The method of claim 7, further comprising generating an output stream of the content, wherein generating the output stream comprises transcoding the at least one non-segment based stream based on the at least one marker.

9. The method of claim 1, wherein each of the at least one non-segment-based stream of the content comprises at least one group of pictures (GOP).

10. The method of claim 9, wherein enabling the switching comprises enabling transcoding of the at least one non-segment-based stream such that a boundary position of the at least one GOP prior to the transcoding is the same as a boundary position of the at least one GOP after the transcoding.

11. The method of claim 9, wherein enabling the switching comprises transcoding the at least one segment-based stream based on a boundary position of the at least one GOP.

12. The method of claim 1, wherein enabling the switching comprises:
recording the at least one non-segment-based stream; and
determining a point in the at least one non-segment based stream at which to switch.

13. The method of claim 12, further comprising transcoding the recorded at least one non-segment-based stream based on the determined point.

14. The method of claim 1, wherein enabling the switching comprises generating a) a first output stream of the content based on the at least one segment-based stream and b) a second output stream based on the at least one non-segment-based stream, wherein the first output stream comprises one or more segments of the content, wherein the second output stream comprises one or more portions of the content, and wherein the one or more portions of the second output stream are aligned with the one or more segments of the first output stream.

15. The method of claim 14, wherein the first output stream comprises a first segment of the content followed by a second segment of the content, wherein the second output stream comprises a first portion of the content followed by a second portion of the content, wherein the first segment of the first output stream is aligned with the first portion of the second output stream, wherein the second segment of the first output stream is aligned with the second portion of the second output stream, and wherein the method further comprises:
transmitting, to the one or more client devices, the first segment of the first output stream or the first portion of the second output stream; and
transmitting, to the one or more client devices, the other of the second segment of the first output stream or the second portion of the second output stream, wherein the second segment or second portion is transmitted following transmission of the first segment or the first portion.

16. A system comprising:
memory comprising instructions for transmitting content using segment-based and non-segment-based streams; and
a processor configured to execute the instructions to:
identify at least one segment-based stream of content, wherein each of the at least one segment-based stream is associated with a respective first bit rate and comprises one or more segments of the content;
identify at least one non-segment-based stream of the content, wherein each of the at least one non-segment-based stream is associated with a second bit rate and comprises a continuous stream of the content;
provide a manifest file that lists the at least one segment-based stream in association with the respective first bit rate and lists another segment-based stream that is representative of the at least one non-segment-based stream in association with the second bit rate; and
enable switching between use of i) the at least one segment-based stream and ii) the at least one non-segment-based stream based at least in part on requests received responsive to providing the manifest file to continuously transmit the content to one or more client devices.

17. The system of claim 16, wherein enabling the switching comprises:
receiving a first indicator of the at least one segment-based stream;
determining one or more output streams of the content to provide to the one or more client devices based on the first indicator and the identified at least one non-segment-based stream; and
generating a second indicator of the one or more output streams.

18. The system of claim 17, wherein the first indicator comprises a first manifest file listing the at least one segment-based stream, and wherein the second indicator comprises a second manifest file listing the one or more output streams.

19. A computer program product comprising instructions stored in a non-transitory computer-readable medium, the instructions comprising:
instructions to identify at least one segment-based stream of content, wherein each of the at least one segment-based stream comprises one or more segments of the content encoded at a respective first bit rate;
instructions to identify at least one non-segment-based stream of the content, wherein each of the at least one non-segment-based stream is associated with a second bit rate and comprises a continuous stream of the content;
instructions to provide a manifest file that lists the respective first bit rate associated with the at least one segment-based stream and the second bit rate associated with another segment-based stream that is representative of the at least one non-segment-based stream; and
instructions to enable switching between use of i) the at least one segment-based stream responsive to a first request for the first bit rate and ii) the at least one non-segment-based stream responsive to a second request for the second bit rate.

20. The computer program product of claim 19, wherein the instructions to enable the switching comprise:

instructions to determine at least one boundary position of the one or more segments of the at least one segment-based stream;
instructions to add at least one marker to the at least one non-segment-based stream based on the determined at least one boundary position; and
instructions to transmit at least one of the at least one segment-based stream or the at least one non-segment-based stream to a gateway device or client device.

* * * * *